United States Patent
Lee et al.

(10) Patent No.: US 9,848,432 B2
(45) Date of Patent: Dec. 19, 2017

(54) OFFLOAD DETERMINATION SYSTEM FOR MULTIPLE WIRELESS NETWORK, SERVER AND METHOD THEREOF

(71) Applicant: Industrial Technology Research Institute, Hsinchu (TW)

(72) Inventors: Chia-Peng Lee, Yilan County (TW); Phone Lin, Taipei (TW); Shun-Neng Yang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 14/979,556

(22) Filed: Dec. 28, 2015

(65) Prior Publication Data

US 2017/0164376 A1    Jun. 8, 2017

(30) Foreign Application Priority Data

Dec. 2, 2015   (TW) .............. 104140255 A

(51) Int. Cl.
*H04W 72/08* (2009.01)
*H04W 4/06* (2009.01)
(Continued)

(52) U.S. Cl.
CPC .......... *H04W 72/085* (2013.01); *H04W 4/06* (2013.01); *H04W 4/14* (2013.01); *H04W 28/08* (2013.01);
(Continued)

(58) Field of Classification Search
CPC ... H04W 72/085; H04W 28/085; H04W 4/06; H04W 72/0406; H04W 4/14; H04W 28/08
(Continued)

(56) References Cited

U.S. PATENT DOCUMENTS

| 8,036,675 B2 | 10/2011 | Chayat et al. |
| 8,483,702 B2 | 7/2013 | Noriega et al. |

(Continued)

FOREIGN PATENT DOCUMENTS

| CN | 103974335 | 8/2014 |
| JP | 2012530439 | 11/2012 |

(Continued)

OTHER PUBLICATIONS

"Office Action of Taiwan Counterpart Application", dated Feb. 2, 2017, p. 1-p. 7, in which the listed references were cited.
(Continued)

*Primary Examiner* — Faisal Choudhury
(74) *Attorney, Agent, or Firm* — JCIPRNET

(57) ABSTRACT

An offload determination system for multiple wireless network, a server and a method thereof are provided. The system includes a server, a first and a second wireless base station and a user equipment (UE). The first and the second wireless base station provides a first and a second wireless network respectively. The server has traffic tariff information corresponding to the UE. The server monitors and obtains quality of service (QoS) information of the first and the second wireless base station respectively, evaluates a data transfer efficiency information of the first and the second wireless base stations according to the traffic tariff information and the QoS information, and transmits the data transfer efficiency information to the UE. The UE selectively uses the first or second wireless network based on the data transmission efficiency information.

26 Claims, 3 Drawing Sheets

(51) Int. Cl.
*H04W 4/14* (2009.01)
*H04W 28/08* (2009.01)
*H04W 72/04* (2009.01)

(52) U.S. Cl.
CPC ..... *H04W 28/085* (2013.01); *H04W 72/0406* (2013.01)

(58) Field of Classification Search
USPC .......................................................... 370/329
See application file for complete search history.

(56) References Cited

U.S. PATENT DOCUMENTS

| | | | |
|---|---|---|---|
| 9,003,391 B2 | 4/2015 | Oh et al. | |
| 2008/0293427 A1* | 11/2008 | Quon ................... | H04M 7/0057 455/452.1 |
| 2011/0096749 A1* | 4/2011 | Rune ................... | H04W 76/022 370/331 |
| 2011/0319072 A1* | 12/2011 | Ekici ................... | H04W 48/18 455/426.1 |
| 2012/0230191 A1* | 9/2012 | Fang ................... | H04W 36/22 370/235 |
| 2013/0163463 A1 | 6/2013 | Grayson et al. | |
| 2013/0265985 A1 | 10/2013 | Salkintzis | |
| 2013/0288673 A1 | 10/2013 | Le et al. | |
| 2014/0162626 A1 | 6/2014 | Cui et al. | |
| 2014/0204745 A1 | 7/2014 | Nuss | |
| 2014/0293829 A1 | 10/2014 | Visuri et al. | |
| 2015/0017985 A1 | 1/2015 | Safavi | |
| 2015/0215850 A1* | 7/2015 | El Moumouhi ...... | H04W 36/14 455/432.1 |
| 2015/0296440 A1 | 10/2015 | Forssell et al. | |
| 2015/0333975 A1* | 11/2015 | Sathyanath ......... | H04L 41/5019 726/3 |

FOREIGN PATENT DOCUMENTS

| | | |
|---|---|---|
| JP | 2014531859 | 11/2014 |
| JP | 2015213313 | 11/2015 |
| JP | 2015532072 | 11/2015 |
| TW | 201507512 | 2/2015 |
| WO | 2014017630 | 7/2016 |

OTHER PUBLICATIONS

"Office Action of Japan Counterpart Application," dated Apr. 18, 2017, p. 1-p. 5, in which the listed references were cited.

Qutqut et al., "HOF: A History-based Offloading Framework for LTE networks using mobile small cells and Wi-Fi," 9th IEEE International Workshop on Performance and Management of Wireless and Mobile Networks, Oct. 21-24, 2013, pp. 77-83.

Nguyen et al., "A Proposal for Dynamic WLAN Selection for Mobile Data Offloading in Heterogeneous Network," 79th IEEE Vehicular Technology Conference (VTC Spring), May 18-21, 2014, pp. 1-5.

Izumikawa et al., "RoCNet: Spatial mobile data offload with user-behavior prediction through delay tolerant networks," IEEE Wireless Communications and Networking Conference (WCNC), Apr. 7-10, 2013, pp. 2196-2201.

3GPP, "Access to the 3GPP Evolved Packet Core (EPC) via non-3GPP access networks; Stage 3," 3GPP TS 24.302, Jun. 2015, pp. 1-107.

IEEE, "Wireless LAN Medium Access Control (MAC) and Physical Layer (PHY) Specifications," IEEE 802.11, Feb. 6, 2012, pp. 1-2793.

Darwood et al., "Mobile network traffic forecasting," 52nd Vehicular Technology Conference, Sep. 24-28, 2000, pp. 2932-2936.

"Office Action of Japan Counterpart Application," dated Jul. 25, 2017, p. 1-p. 4, in which the listed references were cited.

* cited by examiner

OFFLOAD DETERMINATION SYSTEM FOR MULTIPLE WIRELESS NETWORK, SERVER AND METHOD THEREOF

CROSS-REFERENCE TO RELATED APPLICATION

This application claims the priority benefit of Taiwan application serial no. 104140255, filed on Dec. 2, 2015. The entirety of the above-mentioned patent application is hereby incorporated by reference herein and made a part of this specification.

TECHNICAL FIELD

The disclosure generally relates to technology of offload determination for multiple networks, also relates to an offload determination system for multiple networks, a server thereof and a method thereof.

BACKGROUND

The traffic of cellular network has been greatly growing up as to the number of users and the amount of information communication when the smart mobile apparatus has been popular, such as smartphone, tablet computer, or notebook computer. To let the user have and enjoy a good quality of service of the cellular network, some providers of cellular communication gradually takes the technology of mobile data traffic offloading, that is, Wi-Fi offloading. The smart mobile apparatus then can use the Wi-Fi authentication and the roaming mechanism, such as hotspot 2.0 or Access Network Discovery and Selection Function (ANDSF) to automatically switch from the cellular network (e.g. GPRS network, 3G network, or LTE network) to the Wi-Fi network without interruption. The data communication originally needed to be transmitted through the cellular network then can be transmitted through the adjacent Wi-Fi base station, so the network traffic jam in cellular network may be avoided.

However, since the technology of mobile data traffic offloading does not consider the current status of quality of service (QoS) at the cellular network or the Wi-Fi base station, so the network traffic jam may still occur on the smart mobile apparatus. For example, when the smart mobile apparatus is located within the communication range of the Wi-Fi base station, the technology of mobile data traffic offloading would always allow the smart mobile apparatus to use the Wi-Fi base station to transmit data without concerning whether or not the cellular network or the Wi-Fi base station is at the status of the network traffic jam. As a result, the technology of mobile data traffic offloading may not solve the network traffic jam when the traffic jam occurs on the Wi-Fi base station.

On the other hand, some providers of cellular communication adopts the smart data pricing mechanism, which can adjust the price according to the amount of data being used in each period and in each type of network. The user can select one of the network according to the data amount used in network and the budget, such as selectively taking cellular network or Wi-Fi network, so to reduce the cost in use of network and then the probability to use the cellular network can be reduced. However, the user cannot know the current QoS of the cellular network and the Wi-Fi network and then can only manually switch to cellular network or Wi-Fi network according to the status in use for the current situation.

SUMMARY

Exemplary embodiments of disclosure provide an offload determination system for multiple wireless networks, a server thereof and a method thereof. It can automatically and dynamically evaluates which one of the wireless networks where the user equipment is located is better at the future time period, so the minimum cost for data transmission or the best QoS can be reached to. As to each of the wireless base stations, the loadings for the base stations can be easily balanced.

In an exemplary embodiment of disclosure, an offload determination system for multiple wireless networks includes a server, a first wireless base station, a second wireless base station, and a user equipment (UE). The first wireless base station provides a first wireless network. The second wireless base station provides a second wireless network. The UE is located within a communication range of the first wireless network and the second wireless network. The server has a traffic tariff information corresponding to the UE. The server respectively monitors and obtains a QoS information of the first wireless base station and the second wireless base station, evaluates a data transfer efficiency information of the first wireless base station and the second wireless base station according to the traffic tariff information and the QoS information, and transmits the data transfer efficiency information to the UE. The UE selectively uses one of the first wireless network and the second wireless network based on the data transmission efficiency information.

In an exemplary embodiment of disclosure, the server includes a first wireless network transceiver, a second wireless network transceiver and a processor. The first wireless network transceiver is used to obtain a QoS information of the first wireless base station, wherein the first wireless base station is used to provide a first wireless network. The second wireless network transceiver is used to obtain a QoS information of the second wireless base station, wherein the second wireless base station is used to provide a second wireless network. The processor is coupled to the first wireless network transceiver and the second wireless network transceiver. The processor obtains a traffic tariff information of a user equipment, evaluates a data transfer efficiency information of the first wireless base station and the second wireless base station according to the traffic tariff information and the QoS information, and transmits the data transfer efficiency information to the UE. The UE selectively uses one of the first wireless network and the second wireless network based on the data transmission efficiency information.

In an exemplary embodiment of disclosure, the offload determination method for multiple wireless networks is suitable for use in the server. The offload determination method includes the following steps: obtaining a traffic tariff information of a UE; respectively monitoring and obtaining a QoS information of the first wireless base station and the second wireless base station; evaluating a data transfer efficiency information of the first wireless base station and the second wireless base station according to the traffic tariff information and the QoS information; and, transmitting the data transfer efficiency information to the UE. The UE selectively uses one of a first wireless network provided by the first wireless base station and a second wireless network provided by the second wireless base station based on the data transmission efficiency information.

As to the descriptions in the exemplary embodiment of disclosure, the offload determination system for multiple wireless networks, the server thereof and the method thereof can use the QoS information for each of the wireless networks to automatically and dynamically calculate the loading situation for each of the wireless network base stations. In addition, it can automatically evaluate which one of the wireless networks used by each UE is better at the future time period, according to the using preference, such as preferring to the lowest tariff or the maximum bandwidth of the wireless network, and the traffic tariff information used by the UE. The minimum cost for data transmission or the best QoS can be reached to. As to each of the wireless network base stations, the loadings for the base stations can be easily balanced.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

For purposes of explaining the technology and the advantages of the present disclosure, several embodiments are provided with drawings.

The server in an exemplary embodiment of the disclosure can provide the UE, which is at the situation being capable of using multiple wireless networks, to automatically evaluate which one of the wireless networks used by each UE is better at the future time period, according to the traffic tariff information of the UE and the automatic calculation of the loading situation for each of the wireless network base stations. The minimum cost for data transmission or the best QoS can be reached to according to the using preference of the user. In other words, the exemplary embodiment of the disclosure uses the external server to collect the reference information relating to at least two wireless networks, where the UE is located. The reference information includes information of a data traffic tariff information, a QoS of each wireless network, a loading of each wireless network base station, . . . , and so on. The external server can thereby monitor packet flow for the different wireless networks, such as cellular network and Wi-Fi network, and then predict the using status and the data transfer efficiency at the future time period for the wireless network base stations and broadcast or push the predicted information to the UE through the wireless network base station. Thereby, the UE can selectively uses the first wireless network or the second wireless network based on the predicted information. Several exemplary embodiments are provided as the aspects of the disclosure.

Figure 1:
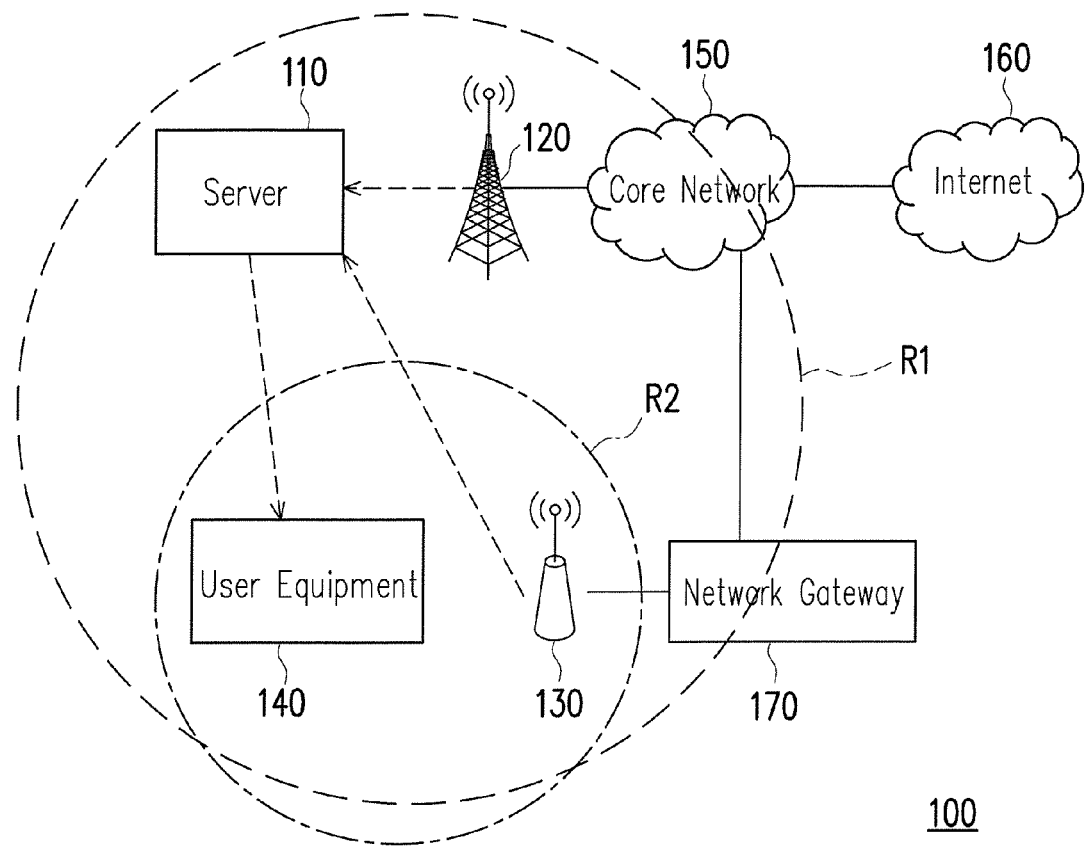
FIG. 1 is a drawing, schematically illustrating an offload determination system for multiple wireless networks, according to an exemplary embodiment of the disclosure.

FIG. 1 is a drawing, schematically illustrating an offload determination system 100 for multiple wireless networks, according to an exemplary embodiment of the disclosure.

The offload determination system 100 includes a server 110, a first wireless base station 120, a second wireless base station 130, and a UE 140. The first wireless base station 120 provides a first wireless network. The communication range of the first wireless network is indicated by R1 in FIG. 1. The second wireless base station 130 provides a second wireless network. The communication range of the second wireless network is indicated by R2 in FIG. 1. The UE 140 is located within the communication range R1 of the first wireless network and the communication range R2 of the second wireless network.

The first wireless network can belong to Wireless Wide Area Network (WWAN), such as long term evolution (LTE) cellular network, third generation (3G) cellular network, or General Packet Radio Service (GPRS) cellular network. The second wireless network can belong to Wireless Local Area Network (WLAN), such as Wi-Fi network. The second wireless network can also belong to Wireless Metropolitan Area (WMAN), such as Worldwide Interoperability for Microwave Access (WiMAX) network, long term evolution (LTE) cellular network, third generation (3G) cellular network, or General Packet Radio Service (GPRS) cellular network. For easy description to the following embodiments, the first wireless network in the exemplary embodiment takes the LTE cellular network for implementation. The first wireless base station 120 can be a small cell or a macro cell and the first wireless base station 120 can connect to the internet 160 through the core network 150. The second wireless network in the exemplary embodiment takes the Wi-Fi network for implementation. The second wireless base station 130 can be Wi-Fi base station, and the second wireless base station 130 connect to the internet 160 through the network gateway 170 and the core network 150.

The UE 140 can detect and selectively use the first network or the second network, and use the network resource, upload data and download data through the selected wireless network, which is connected to the internet 160. For example, the UE 140 can be smart mobile apparatus, tablet computer, notebook computer, handheld game console, or any other like.

To let the UE 140 obtain the individual loading situation of the first wireless base station 120 where the UE 140 is located, the individual loading situation of the second wireless base station 130, and the data traffic tariff information of the UE 140, the server 110 in the exemplary embodiment of the disclosure can respectively monitor the first wireless base station 120 and the second wireless base station 130 in each region, and respectively obtain the QoS information with respect to the first wireless base station 120 and the second wireless base station 130 from the packet of the first wireless network and the second wireless network. On the other hand, the server 110 can also automatically in the usual time collect the data traffic tariff information provided from each provider of cellular network. The server 110 and the UE 140 communicate to each other to obtain the data traffic tariff information taken by the UE 140.

When the first wireless base station 120 is the small cell of LTE cellular network, the small cell then periodically broadcast the system information to each of the UEs 140 within the communication range R1. When the server 110 is located within the communication range R1, then system information of the first wireless network (LTE cellular network) can be obtained and the system information contains the QoS information. The QoS information of the LTE cellular network can include individual information of the small cell about the loading information, the allocation information of the transfer resource and the relation information of the WLAN, such as Received Signal Strength Indication (RSSI) threshold value, Billing Supporting System (BSS) threshold value and signal measuring threshold value. The loading information/loading state of the individual base station in the exemplary embodiment of disclosure can be the using rate of the processor, such as central processing unit, of the individual base station. The loading information/loading state of the individual base station can also be the using rate of the dynamic random access memory (DRAM) in the base station. The loading information can be expressed by percentage (%). On the other hand, when the second wireless base station 130 is the Wi-Fi station of Wi-Fi network, the Wi-Fi base station does not actively broadcast the system information/the QoS information of the Wi-Fi network. The server 110 may obtain the QoS information of Wi-Fi network from the Wi-Fi base station through Access Network Query Protocol (ANQP) defined by IEEE 802.11u. In the exemplary embodiment, the Wi-Fi base station has the ANQP module to implement the ANQP function. The QoS information of the Wi-Fi network may include connection status of Wi-Fi base station, connection type (symmetric transmission or asymmetric transmission), data transmission rate in uplink and downlink and loading status of the Wi-Fi base station itself. Thereby, the server 110 at multiple specific time points may respectively monitor, obtain and store the QoS information of the wireless networks. Thereby, it can be known at the specific time points about the data transmission rate in the uplink and downlink for each wireless network and the individual loading status of the wireless base stations 120, 130.

In addition, as still under some embodiments of the disclosure, if the wireless networks themselves have already installed with the Self Organizing Network (SON) structure, then the server 110 going through the SON structure can also obtain the QoS information and the other information of the first wireless base stations 120 and the second wireless base stations 130.

The following exemplary embodiments as provided would describe how the server 110 evaluates the data transfer efficiency information based on the traffic tariff information and the QoS of the wireless networks. Assuming the current time point is 10:00, Table 1 shows the list of traffic tariff of the UE 140 at the future time points such as in time period of 10:00-10:30. In brief, the traffic tariffs at the future time points are shown. The traffic tariffs obtained by the server can be listed with respect to the time points. The cost in Table 1 as the example for description is in unit of New Taiwan Dollar (NTD) per Byte.

TABLE 1

| Future time points/<br>network tariff<br>(NTD/byte) | 10:00 | 10:10 | 10:20 | 10:30 |
|---|---|---|---|---|
| Tariff of first wireless network (LTE) | 0.4 | 0.4 | 0.3 | 0.3 |
| Tariff of second wireless network (Wi-Fi) | 0.3 | 0.3 | 0.5 | 0.5 |

Table 2 and Table 3 are the list of information when the server is at the specific time points within a time period, such as 9:30-10:00, in which Table 2 lists the history information of data transfer rate for each wireless network at each of the different time points processed from the QoS information (data transmission rate in the uplink and downlink, individual loading status of the wireless base stations 120, 130) and Table 3 lists the history information of the loading status of each base station. Table 2 takes the unit of bit per second in transmission to judge the transmission flow.

TABLE 2

| Time points/network | 9:30 | 9:40 | 9:50 | 10:00 |
|---|---|---|---|---|
| First wireless network (Mbps) | 50 | 40 | 25 | 29 |
| Second wireless network (Mbps) | 20 | 30 | 30 | 15 |

Table 3 takes the percentage (%) for judging the loading status of the first wireless base station and the second wireless base station.

TABLE 3

| Time points/network | 9:30 | 9:40 | 9:50 | 10:00 |
|---|---|---|---|---|
| First wireless network (%) | 54 | 63 | 78 | 72 |
| Second wireless network (%) | 58 | 46 | 45 | 60 |

According to Table 1 to Table 3, the server 110 using the Markov Decision Process (MDP) model can calculate the data transfer efficiency information (dynamic reference table) according to the data transmission rates and the traffic tariff information at the specific time points. The MDP model can evaluate the trend of the data flow in the future based on the known bandwidth data and use the evaluated data to produce the dynamic reference table, as shown in Table 4. The columns in the dynamic reference table (Table 4) includes several future time points, such as 10:00, 10:10, 10:20, 10:30, using preference with respect to the future time points, and suggested type of network to be used. The suggested type of network can be one of the first wireless network and the second wireless network. The using preference in Table 4 can be distinct as "digital transmission in maximum quality", "with a level of data transmission quality (the transmission rate is at least greater than a given value)" and "minimum price". "L" in Table 4 represents the first wireless network (LTE wireless network) and "W" represents the second wireless network (Wi-Fi network).

TABLE 4

| Future time points/<br>Using preference | 10:00 | 10:10 | 10:20 | 10:30 |
|---|---|---|---|---|
| Digital transmission in maximum quality | W | L | W | W |
| With a level of data transmission quality | W | W | W | L |
| Minimum price | W | W | L | L |
| | | W: 0.3 NTD/Byte | | W: 0.5 NTD/Byte |
| | | L: 0.4 NTD/Byte | | L: 0.3 NTD/Byte |

For example, if the using preference of the user is at "Digital transmission in maximum quality", then the server 110 would suggest the UE 140 to use the second wireless network (Wi-Fi network) as better at the future time points 10:00, 10:20 and 10:30, however, to use the first wireless network (LTE network) as better at the future time points 10:10. If the using preference of the user is at "with a level of data transmission quality" then the server 110 would suggest the UE 140 to use the second wireless network (Wi-Fi network) as better at the future time points 10:00, 10:10 and 10:20, however, to use the first wireless network (LTE network) as better at the future time points 10:30. If the using preference of the user is at "minimum price" then the server 110 would suggest the UE 140 to use the second wireless network (Wi-Fi network) as better at the future time points 10:00 and 10:10, however, to use the first wireless network (LTE network) as better at the future time points 10:20 and 10:30.

Thereby, the server 110 transmits the data transfer efficiency information (Table 4) to the UE 140. The UE 140 can selectively use one of the first wireless network (LTE network) and the second wireless network (Wi-Fi network), according to the data transfer efficiency information (Table 4). In addition, the server 110 is continuously monitoring the QoS information of the first wireless base station 120 and the second wireless base station 130. When a change of the QoS information occurs, the server 110 would dynamically update the data transfer efficiency information (Table 4) and broadcast the data transfer efficiency information (Table 4) to the UE 140 for dynamically adjusting.

Beside of directly transmitting the data transfer efficiency information (Table 4) to the UE 140, the server 110 can also uses information broadcasting function in default carried by the first wireless base station 120 to push-broadcast the data transfer efficiency information to the UE 140 by the method of cell broadcast or the method of cell unicast. If all of the UEs 140 take the same tariff, the server 110 can uses the method of cell broadcast to transmit the data transfer efficiency information to this region. In the exemplary embodiment, the cell broadcast can perform the action by Short Message System (SMS) through the first wireless base station 120. On the other hand, when each UE 140 uses different tariff, the server need to customize the data transfer efficiency information for the UE 140 and use the method of cell unicast through the first wireless base station 120 to transmit the data transfer efficiency information to the UE 140.

The UE 140 can automatically adjust the wireless network in use according to the evaluated results of the Table 4. Alternatively, the evaluated results of the Table 4 can be provided to the user to determine whether or not the dynamically adjusting is needed or manually adjust the wireless network by the user.

Figure 2:
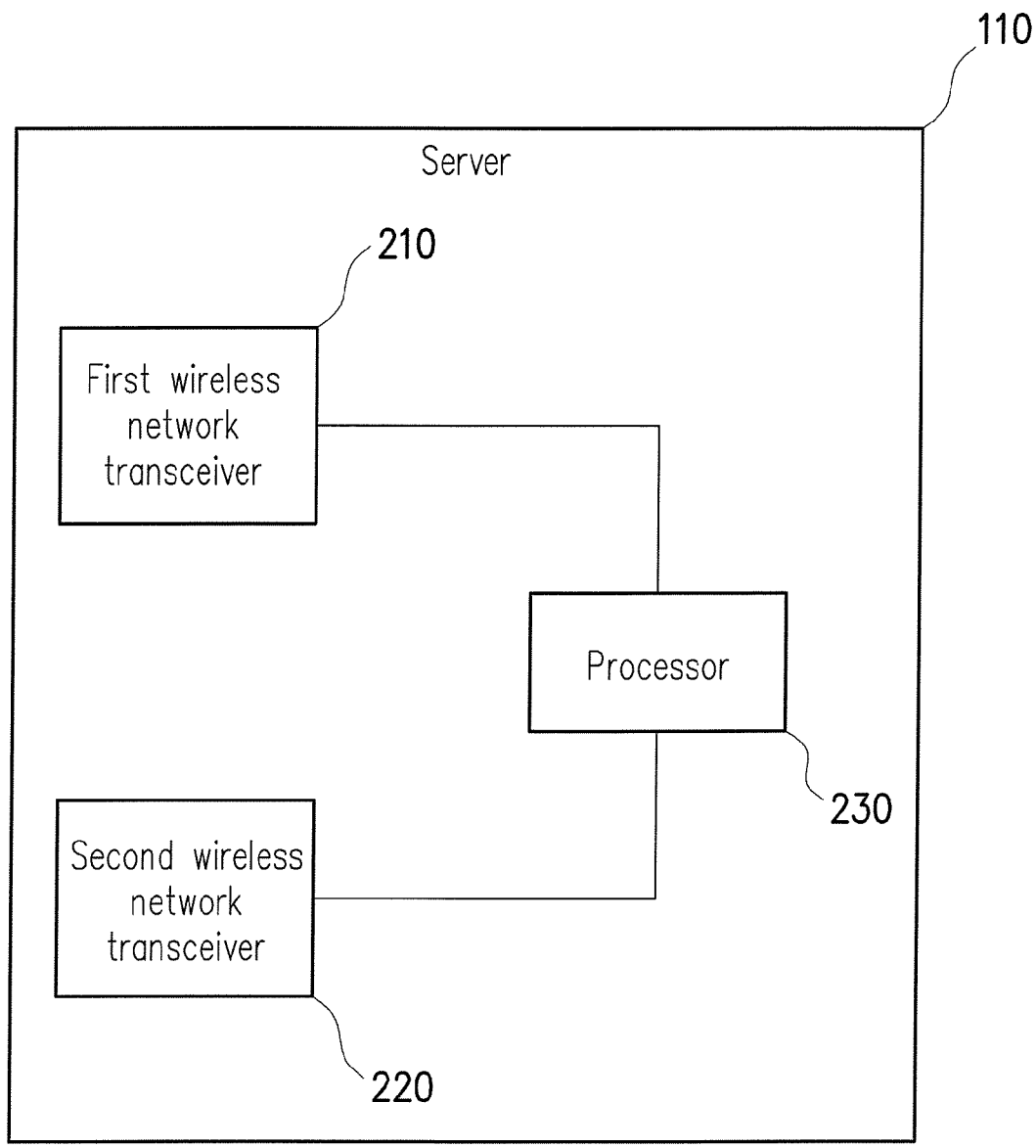
FIG. 2 is a drawing, schematically illustrating the functional block of a server, according to an exemplary embodiment of the disclosure.

FIG. 2 is a drawing, schematically illustrating the functional block of a server, according to an exemplary embodiment of the disclosure. The server 110 includes a first wireless network transceiver 210, a second wireless network transceiver 220 and a processor 230. The first wireless network transceiver 210 can be a network accessing chip of LTE cellular network or a network module. The second wireless network transceiver 220 can be a Wi-Fi network or a network module. The processor 230 can be a central processing unit, a system chip, or an integrated circuit.

Figure 3:
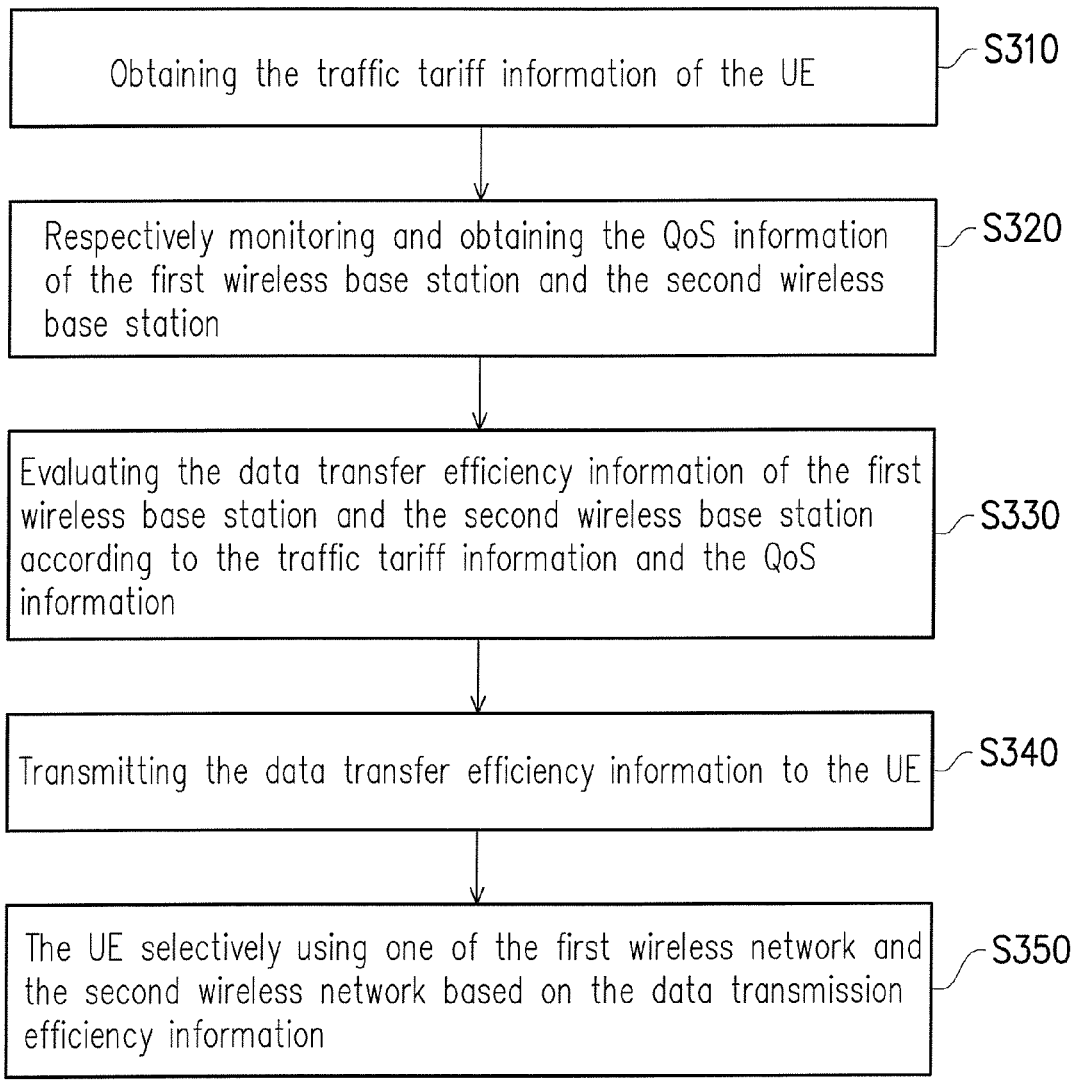
FIG. 3 is a drawing, schematically illustrating a flow diagram of an offload determination method for multiple wireless networks, according to an exemplary embodiment of the disclosure.

FIG. 3 is a drawing, schematically illustrating a flow diagram of an offload determination method for multiple wireless networks, according to an exemplary embodiment of the disclosure. Referring to FIG. 1 to FIG. 3, in step S310, the processor 230 of the server 110 can obtain the traffic tariff information of the UE 140 through the network. In set S320, the processor 230 of the server 110 respectively monitors and obtains the QoS information of the first wireless base station 120 and the second wireless base station 130 through the first wireless network transceiver 210 and the second wireless network transceiver 220. In step S330, the processor 230 evaluates the data transfer efficiency information of the first wireless base station and the second wireless base station according to the traffic tariff information and the QoS information. In step S340, the processor 230 directly or indirectly transmits (e.g. through the first wireless base station 120 or the second wireless base station 130) the data transfer efficiency information to the UE 140. Thereby, in step S350, the UE 140 can selectively use one of the first wireless network and the second wireless network based on the data transmission efficiency information. The implementation of offload determination method in detail can be referred to the foregoing exemplary embodiments.

As to the foregoing descriptions with exemplary embodiment of disclosure, the offload determination system for multiple networks, a server thereof and a method thereof can use the QoS information for each of the wireless networks to automatically and dynamically calculate the loading situation for each of the wireless network base stations. In addition, it can automatically evaluate which one of the wireless networks used by each UE is better at the future time period based on the using preference, such as preferring to the lowest tariff or the maximum bandwidth of the wireless network, and the traffic tariff information used by the UE. The minimum cost for data transmission or the best QoS can be reached to. As to each of the wireless network base stations, the loadings for the base stations can be easily balanced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An offload determination system for multiple wireless networks comprising:
    a server;
    a first wireless base station, to provide a first wireless network;
    a second wireless base station, to provide a second wireless network; and
    a user equipment (UE), locating within a communication range of the first wireless network and the second wireless network, wherein the server has a traffic tariff information corresponding to the UE,
    wherein the server respectively monitors and obtains a quality of service (QoS) information of the first wireless base station and the second wireless base station, and evaluates a data transfer efficiency information of the first wireless base station and the second wireless base station according to the traffic tariff information and the QoS information, and transmits the data transfer efficiency information to the UE,
    wherein the UE selectively uses one of the first wireless network and the second wireless network based on the data transmission efficiency information, and the QoS information at least comprises data transmission rates in uplink and downlink and a loading status of the first wireless base station and the second wireless base station, with respect to a plurality of specific time points.

2. The offload determination system according to claim 1, wherein the first wireless network belongs to Wireless Wide Area Network (WWAN) and the second wireless network belongs to Wireless Local Area Network (WLAN) or Wireless Metropolitan Area (WMAN).

3. The offload determination system according to claim 2, wherein the first wireless network is long term evolution (LTE) cellular network, third generation (3G) cellular network, or General Packet Radio Service (GPRS) cellular network, and the second wireless network is Wi-Fi network, Worldwide Interoperability for Microwave Access (WiMAX) network, LTE cellular network, 3G cellular network, or GPRS cellular network.

4. The offload determination system according to claim 1, wherein the QoS information further comprises data transmission rates at the plurality of specific time points.

5. The offload determination system according to claim 4, wherein the data transmission efficiency information is expressed by a dynamic reference table (DRT),
wherein columns of the DRT comprise multiple future time points and a suggested type of network to be used, wherein the suggested type of network is one of the first wireless network and the second wireless network.

6. The offload determination system according to claim 5, wherein the columns of the DRT further comprise a using preference and the suggested type of network with respect to the future time points.

7. The offload determination system according to claim 5, wherein the server uses a Markov Decision Process (MDP) model to calculate the DRT according to the data transmission rates and the traffic tariff information at the specific time points, and
when a change of the QoS information occurs, the server dynamically produces the DRT being updated and push-broadcasts the updated DRT to the UE.

8. The offload determination system according to claim 1, wherein the server push-broadcasts the data transmission efficiency information to the UE through the first wireless base station by a method of a cell broadcast or a method of a cell unicast.

9. The offload determination system according to claim 8, wherein the cell broadcast is a Short Message System (SMS).

10. A server, comprising:
a first wireless network transceiver, to obtain a quality of service (QoS) information of the first wireless base station, wherein the first wireless base station is used to provide a first wireless network;
a second wireless network transceiver, to obtain a QoS information of the second wireless base station, wherein the second wireless base station is used to provide a second wireless network; and
a processor, coupled to the first wireless network transceiver and the second wireless network transceiver,
wherein the processor obtains a traffic tariff information of a user equipment (UE), and evaluates a data transfer efficiency information of the first wireless base station and the second wireless base station according to the traffic tariff information and the QoS information, and transmits the data transfer efficiency information to the UE,
wherein the UE selectively uses one of the first wireless network and the second wireless network based on the data transmission efficiency information, the QoS information at least comprises data transmission rates in uplink and downlink and a loading status of the first wireless base station and the second wireless base station, with respect to a plurality of specific time points.

11. The server according to claim 10, wherein the first wireless network belongs to Wireless Wide Area Network (WWAN) and the second wireless network belongs to Wireless Local Area Network (WLAN) or Wireless Metropolitan Area (WMAN).

12. The server according to claim 10, wherein the first wireless network is long term evolution (LTE) cellular network, third generation (3G) cellular network, or General Packet Radio Service (GPRS) cellular network, and the second wireless network is Wi-Fi network, Worldwide Interoperability for Microwave Access (WiMAX) network, LTE cellular network, 3G cellular network, or GPRS cellular network.

13. The server according to claim 10, wherein the QoS information further comprises data transmission rates at the plurality of specific time points.

14. The server according to claim 13, wherein the data transmission efficiency information is expressed by a dynamic reference table (DRT),
wherein columns of the DRT comprise multiple future time points and a suggested type of network to be used, wherein the suggested type of network is one of the first wireless network and the second wireless network.

15. The server according to claim 14, wherein the columns of the DRT further comprise a using preference and the suggested type of network with respect to the future time points.

16. The server according to claim 14, wherein the processor uses a Markov Decision Process (MDP) model to calculate the DRT according to the data transmission rates and the traffic tariff information at the specific time points, and
when a change of the QoS information occurs, the processor dynamically produces the DRT being updated and push-broadcasts the updated DRT to the UE.

17. The server according to claim 10, the processor push-broadcasts the data transmission efficiency information to the UE through the first wireless base station by a method of a cell broadcast or a method of a cell unicast.

18. The offload determination system according to claim 17, wherein the cell broadcast is a Short Message System (SMS).

19. An offload determination method for multiple wireless networks, suitable for use in a server, comprising:
obtaining a traffic tariff information of a user equipment (UE);
respectively monitoring and obtaining a QoS information of the first wireless base station and the second wireless base station;
evaluating a data transfer efficiency information of the first wireless base station and the second wireless base station according to the traffic tariff information and the QoS information; and
transmitting the data transfer efficiency information to the UE, wherein the UE selectively uses one of a first wireless network provided by the first wireless base station and a second wireless network provided by the second wireless base station based on the data transmission efficiency information,
wherein the QoS information at least comprises data transmission rates in uplink and downlink and a loading status of the first wireless base station and the second wireless base station, with respect to a plurality of specific time points.

20. The offload determination method according to claim 19, wherein the first wireless network belongs to Wireless Wide Area Network (WWAN) and the second wireless network belongs to Wireless Local Area Network (WLAN) or Wireless Metropolitan Area (WMAN).

21. The offload determination method according to claim 20, wherein the first wireless network is long term evolution (LTE) cellular network, third generation (3G) cellular network, or General Packet Radio Service (GPRS) cellular network, and the second wireless network is Wi-Fi network, Worldwide Interoperability for Microwave Access (Wi-MAX) network, LTE cellular network, 3G cellular network, or GPRS cellular network.

22. The offload determination method according to claim 20, wherein the QoS information further comprises data transmission rates at the plurality of specific time points.

23. The offload determination method according to claim 20, wherein the data transmission efficiency information is expressed by a dynamic reference table (DRT),
wherein columns of the DRT comprise multiple future time points and a suggested type of network to be used, wherein the suggested type of network is one of the first wireless network and the second wireless network.

24. The offload determination method according to claim 23, wherein the columns of the DRT further comprise a using preference and the suggested type of network with respect to the future time points.

25. The offload determination method according to claim 23, wherein the step of evaluating the data transfer efficiency information of the first wireless base station and the second wireless comprises:
using a Markov Decision Process (MDP) model to calculate the DRT according to data transmission rates and the traffic tariff information at the specific time points, and
dynamically producing the DRT being updated and push-broadcasting the updated DRT to the UE when a change of the QoS information occurs.

26. The offload determination method according to claim 19, wherein the step of transmitting the data transfer efficiency information to the UE comprises:
push-broadcasting the data transmission efficiency information to the UE by a method of cell broadcast or a method of cell unicast.

* * * * *